US009217050B2

(12) United States Patent
Fornof et al.

(10) Patent No.: US 9,217,050 B2
(45) Date of Patent: Dec. 22, 2015

(54) CROSSLINKABLE COMPOSITION COMPRISING PHOTOBASE GENERATORS

(71) Applicant: 3M INNOVATIVE PROPERTIES COMPANY, St. Paul, MN (US)

(72) Inventors: Ann R. Fornof, St. Paul, MN (US); Mary M. Caruso Dailey, Maplewood, MN (US); Jason D. Clapper, Lino Lakes, MN (US); Serkan Yurt, Woodbury, MN (US); Larry R. Krepski, White Bear Lake, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/379,762

(22) PCT Filed: Mar. 15, 2013

(86) PCT No.: PCT/US2013/031847
§ 371 (c)(1),
(2) Date: Aug. 20, 2014

(87) PCT Pub. No.: WO2013/151739
PCT Pub. Date: Oct. 10, 2013

(65) Prior Publication Data
US 2015/0232596 A1    Aug. 20, 2015

Related U.S. Application Data

(60) Provisional application No. 61/619,560, filed on Apr. 3, 2012.

(51) Int. Cl.
| | |
|---|---|
| *C08F 2/46* | (2006.01) |
| *C08G 61/04* | (2006.01) |
| *C08F 220/68* | (2006.01) |
| *C09J 7/02* | (2006.01) |
| *C09J 133/14* | (2006.01) |

(52) U.S. Cl.
CPC .............. *C08F 220/68* (2013.01); *C09J 7/02* (2013.01); *C09J 133/14* (2013.01); *C09J 2433/00* (2013.01)

(58) Field of Classification Search
USPC ............. 522/28, 7, 6, 71, 189, 184, 1; 520/1
See application file for complete search history.

(56) References Cited

U.S. PATENT DOCUMENTS

| | | | |
|---|---|---|---|
| 3,018,262 A | 1/1962 | Schroeder | |
| 3,298,998 A | 1/1967 | McConnell | |
| 4,547,323 A | 10/1985 | Carlson | |
| 4,619,979 A | 10/1986 | Kotnour | |
| 4,843,134 A | 6/1989 | Kotnour | |
| 5,130,347 A | 7/1992 | Mitra | |
| 5,157,108 A | 10/1992 | Krepski | |
| 5,637,646 A | 6/1997 | Ellis | |
| 5,650,261 A | 7/1997 | Winkle | |
| 5,804,610 A | 9/1998 | Hamer | |
| 7,556,858 B2 | 7/2009 | Rasmussen | |
| 2001/0006759 A1* | 7/2001 | Shipley et al. ............. 430/280.1 |
| 2006/0052475 A1* | 3/2006 | Husemann et al. ............. 522/79 |
| 2011/0237725 A1 | 9/2011 | Clapper | |
| 2012/0208965 A1 | 8/2012 | Joly | |

FOREIGN PATENT DOCUMENTS

| | | |
|---|---|---|
| DE | 10237950 | 3/2004 |
| WO | WO 2009-123122 | 10/2009 |
| WO | WO 2010-113813 | 10/2010 |

OTHER PUBLICATIONS

Frechet, "Photogenerated Amines and Diamines: Novel Curing systems for Thin Film Coating", Journal. of Polymeric. Materials. Science. Engineering, 1991, vol. 64, pp. 55-56.
Rasmussen, Polyazlactones,' Encyclopedia of Polymer Science and Engineering, $2^{nd}$ Edition, 1988, $2^{nd}$ Edition, vol. 11, pp. 558-571.
Heilmann, Chemistry of Alkenyl Azlactones. IV. Preparation and Properties of Telechelic Acrylamides Derived from Amine-terminated Oligomers,Journal of Polymer Science: Polymer Chemistry Edition, 1984, Vo. 22, pp. 3149-3160.
Cameron, Photogeneration of Organic Bases from o-Nitrobenzyl-Derived Carbamates, Journal of American Chemical Society, 1991, vol. 113, No. 11, pp. 4303-4313.
Cameron, "Base Catalysis in Imaging Materials. 1. Design and Synthesis of Novel Light-Sensitive Urethanes as Photoprecursors of Amines", Journal of Organic Chemistry, 1990, vol. 55, No. 23, pp. 5919-5922.
Tachi, "Photochemical Reactions of Quaternary Ammonium Dithiocarbamates as Photobase Generators and Their Use in the Photoinitiated Thermal Crosslinking of Poly(glycidyl methacrylate)", Journal of Polymer Science, Part A: Polymer Chemistry, 2001, vol. 39, pp. 1329-1341.
Shirai, "Photoacid and Photobase Generators: Chemistry and Applications to Polymeric Materials", Progress in Polymer Science, 1996, vol. 21, No. 1, pp. 1-45. XP-002299394.
Moad, "Chain Transfer Activity of ö-Unsaturated Methyl Methacrylate Oligomers", Macromolecules, 1996, vol. 29, No. 24, pp. 7717-7726.
International Search Report for PCT International Application No. PCT/US2013/031847 on Aug. 1, 2013, 3 pages.

* cited by examiner

*Primary Examiner* — Ling Choi
*Assistant Examiner* — Jessica E Whiteley
(74) *Attorney, Agent, or Firm* — Kent S. Kokko

(57) ABSTRACT

The present disclosure provides an crosslinkable composition comprising a (meth)acrylate copolymer component having pendant photobase functional groups and a crosslinking agent that has amine-reactive functional groups. On exposure to light, the pendant photobase group photolyzes to provide a pendant amine group, that crosslinks the copolymer.

33 Claims, No Drawings

CROSSLINKABLE COMPOSITION COMPRISING PHOTOBASE GENERATORS

CROSS REFERENCE TO RELATED APPLICATIONS

This application is a national stage filing under 35 U.S.C. 371 of PCT/US2013/031847, filed Mar. 15, 2013, which claims priority to Provisional Application No. 61/619560, filed Apr. 3, 2012, the disclosure of which is incorporated by reference in its/their entirety herein.

This invention relates to (meth)acrylate copolymer compositions that are photoactivated by actinic radiation to crosslink such copolymers. The pressure-sensitive adhesives and tape articles prepared therefrom are characterized by exhibiting an overall balance of adhesive and cohesive characteristics and exceptional load bearing capabilities.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY

The present disclosure provides a crosslinkable composition comprising:
   a) a polyfunctional amine-reactive component, and
   b) a polyamine photobase generator component;
wherein at least one of component a) and b) are a (meth)acrylate copolymer.

On exposure to light, the pendant photobase group of the polyamine photobase generator component fragments or photolyzes to provide an amine group that reacts with the amine-reactive groups of the polyfunctional amine-reactive component and crosslinks the two components. The crosslinkable composition may be used as pressure-sensitive adhesives in the construction of adhesive articles, such as single and double coated adhesive tapes, and in affixing substrates together.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

"Alkyl" means a linear or branched, cyclic or acylic, saturated monovalent hydrocarbon having from one to about 28, preferably one to 12, carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Heteroalkyl" includes both straight-chained, branched, and cyclic alkyl groups with one or more heteroatoms independently selected from S, P, Si, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"Aryl" is an aromatic group containing 6-18 ring atoms and can contain optional fused rings, which may be saturated, unsaturated, or aromatic. Examples of an aryl groups include phenyl, naphthyl, biphenyl, phenanthryl, and anthracyl. Heteroaryl is an aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(Hetero)hydrocarbyl" is inclusive of hydrocarbyl alkyl and aryl groups, and heterohydrocarbyl heteroalkyl and heteroaryl groups, the later comprising one or more catenary oxygen heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxyl)ethyl, 3,6-dioxaheptyl, 3,6-dioxahexyl-6-phenyl, in addition to those described for "alkyl", "heteroalkyl", "aryl", and "heteroaryl" supra.

DETAILED DESCRIPTION

The present disclosure provides a crosslinkable composition comprising:
a) a polyfunctional amine-reactive component, and
b) a polyamine photobase generator component;
wherein at least one of component a) and b) are a (meth)acrylate copolymer.

In a first embodiment the disclosure provides a crosslinkable composition where the polyfunctional amine-reactive component is a (meth)acrylate copolymer component having pendant amine-reactive functional groups and the polyamine photobase generator component is non-polymeric.

The (meth)acrylate copolymer component having pendant amine-reactive functional groups may comprise a copolymer of interpolymerized monomer units including (meth)acrylate monomer units, amine-reactive functional monomer units, optional acid-functional monomer units, optional non-acid functional, polar monomer units, optional vinyl monomer units and optional multifunctional (meth)acrylate monomer units. More particularly, the acid-functional (meth)acrylate copolymer may comprise:
1) 40 to 99.5 parts by weight, preferably 85 to 99.5 parts by weight, of an (meth)acrylic acid ester monomer units;
2) 0.5 to 15 parts by weight of amine-reactive functional monomer units;
3) 0 to 10 parts by weight, preferably 0 to 5 parts by weight, of an acid functional monomer units;
4) 0 to 15 parts by weight of a second, non-acid functional, polar monomer units;
5) 0 to 15 parts vinyl monomer units, and
6) 0 to 5 parts by weight of multifunctional (meth)acrylate monomer units,
where the sum of the monomer units is 100 parts by weight.

The amine-reactive functional groups of the (meth)acrylate polymer may be any functional group that forms a covalent bond with the amine generated by the photobase generator component and are selected from carboxyl, oxazolinyl, azlactone, acetyl, acetonyl, acetoacetyl, ester, isocyanato, epoxy, aziridinyl, acyl halide, and cyclic anhydride groups.

The (meth)acrylate copolymer having amine-reactive functional groups is of the formula:

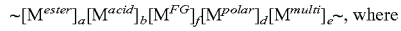

$[M^{ester}]$ represents (meth)acrylate monomer units, $[M^{acid}]$ represent acid functional monomer units, $[M^{FG}]$ are monomer units having an amine-reactive functional group $[M^{polar}]$, represents non-acid polar monomer units, $[M^{multi}]$ represent multifunctional (meth)acrylate monomer units, and the subscripts a, b, f, d and e represent the parts by weight of the respective monomer units in the copolymer.

The (meth)acrylate copolymer component having pendant amine-reactive functional groups comprises monomer units (labeled $M^{FG}$ supra) derived from monomers of the formula:

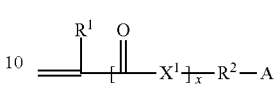

wherein
$X^1$ is —O— or —$NR^1$—, where $R^1$ is H or $C_1$-$C_4$ alkyl,
$R^1$ is H or $C_1$-$C_4$ alkyl;
$R^2$ is a single bond or a (hetero)hydrocarbyl linking group,
A is a functional group that is reactive with the amino groups generated by the photobase generator component, and
x is 0 or 1. More particularly, "A" may be selected from carboxyl, oxazolinyl, azlactone, acetyl, acetonyl, acetoacetyl, ester, isocyanato, epoxy, aziridinyl, acyl halide, and cyclic anhydride groups.

In some embodiments compounds of Formula I are (meth) acryloyl compounds, and in other embodiments are alkenyl compounds.

Preferably, $R^2$ is a single bond or a hydrocarbyl linking group that joins an ethylenically unsaturated, polymerizable group (e.g. alkenyl or (meth)acryl group) to reactive functional group A and preferably is an alkylene group having 1 to 6 carbon atoms, a 5- or 6-membered cycloalkylene group having 5 to 10 carbon atoms, or a divalent aromatic group having 6 to 16 carbon atoms; and A is a reactive functional group capable of reacting with an amine group of the photogenerator polyamine polymer.

Useful reactive functional groups "A" include carboxyl, oxazolinyl, azlactone, acetyl, acetonyl, acetoacetyl, ester, isocyanato, epoxy, aziridinyl, acyl halide, and cyclic anhydride groups. Preferably the amine-reactive functional groups A are selected to react with the amine groups of the photogenerator polyamine polymer at temperatures below about 50° C., preferably below 25° C. such that the reaction takes place after the generation of the photobase.

Representative azlactone group-substituted functional compounds of Formula I include: 2-ethenyl-1,3-oxazolin-5-one; 2-ethenyl-4-methyl-1,3-oxazolin-5-one; 2-isopropenyl-1,3-oxazolin-5-one; 2-isopropenyl-4-methyl-1,3-oxazolin-5-one; 2-ethenyl-4,4-dimethyl-1,3-oxazolin-5-one; 2-isopropenyl-4,4-dimethyl-1,3-oxazolin-5-one; 2-ethenyl-4-methyl-4-ethyl-1,3-oxazolin-5-one; 2-isopropenyl-3-oxa-1-aza[4.5]spirodec-1-ene-4-one; 2-ethenyl-5,6-dihydro-4H-1,3-oxazin-6-one; 2-ethenyl-4,5,6,7-tetrahydro-1,3-oxazepin-7-one; 2-isopropenyl-5,6-dihydro-5,5-di(2-methylphenyl)-4H-1,3-oxazin-6-one; 2-acryloyloxy-1,3-oxazolin-5-one; 2-(2-acryloyloxyl)ethyl-4,4-dimethyl-1,3-oxazolin-5-one; 2-ethenyl-4,5-dihydro-6H-1,3-oxazin-6-one; and 2-ethenyl-4,5-dihydro-4,4-dimethyl-6H-1,3-oxazin-6-one.

Representative acetoacetyl group-substituted functional compounds of Formula I include 2-(acetoacetoxy)ethyl methacrylate.

Representative carboxyl group-substituted functional compounds of Formula I include (meth)acrylic acid, 3-(meth)acryloyloxy-propionic acid, 4-(meth)acryloyloxy-butyric acid, 2-(meth)acryloyloxy-benzoic acid, 3-(meth)acryloyloxy-5-methyl benzoic acid, 4-(meth)acryloyloxymethyl-benzoic acid, phthalic acid mono-[2-(meth)acryloyloxy-ethyl]ester, 2-butynoic acid, and 4-pentynoic acid.

Representative isocyanate group-substituted functional compounds of Formula I include 2-isocyanatoethyl (meth)acrylate, 3-isocyanatopropyl (meth)acrylate, 4-isocyanatocyclohexyl (meth)acrylate, 4-isocyanatostyrene, 2-methyl-2-propenoyl isocyanate, 4-(2-(meth)acryloyloxyethoxycarbonylamino) phenylisocyanate, allyl 2-isocyanatoethylether, and 3-isocyanato-1-propene.

Representative epoxy group-substituted functional compounds of Formula I include glycidyl (meth)acrylate, thioglycidyl (meth)acrylate, 3-(2,3-epoxypropoxy)phenyl (meth)acrylate, 2-[4-(2,3-epoxypropoxyl)phenyl]-2-(4-(meth)acryloyloxy-phenyl)propane, 4-(2,3-epoxypropoxyl) cyclohexyl (meth)acrylate, 2,3-epoxycyclohexyl (meth)acrylate, and 3,4-epoxycyclohexyl (meth)acrylate.

Representative acyl halide group-substituted functional compounds of Formula I include (meth)acryloyl chloride, α-chloro(meth)acryloyl chloride, (meth)acryloyloxyacetyl chloride, 5-hexenoyl chloride, 2-(acryloyloxy) propionyl chloride, 3-(acryloylthioxy) propionoyl chloride, and 3-(N-acryloyl-N-methylamino) propionoyl chloride.

Other useful amine-reactive monomers include anhydride group-substituted functional monomers including maleic anhydride, (meth)acrylic anhydride, itaconic anhydride, 3-(meth)acryloyloxyphthalic anhydride, and 2-(meth)acryloxycyclohexanedicarboxylic acid anhydride.

The (meth)acrylate copolymer having amine-reactive functional groups may comprise 0.5 to 15 parts by weight of amine-reactive functional monomer units, preferably 1 to 5 parts by weight.

The (meth)acrylate ester monomer useful in preparing the acid functional (meth)acrylate adhesive copolymer is a monomeric (meth)acrylic ester of a non-tertiary alcohol, which alcohol contains from 1 to 32 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomers are suitable. In some embodiments, the preferred (meth)acrylate ester monomer is the ester of (meth)acrylic acid with an alcohol derived from a renewable sources, such as 2-octanol, citronellol, dihydrocitronellol.

The adhesive copolymer generally comprises 40 to 99.5, preferably 85 to 99.5 parts by weight of an (meth)acrylic acid ester monomer units, and most preferably 95 to 99 parts by weight.

In some embodiments it is desirable for the (meth)acrylic acid ester monomer component to include a high $T_g$ monomer. By "high $T_g$ monomer" it is meant the homopolymer of such monomers have a $T_g$ of at least 25° C., and preferably at least 50° C. Examples of suitable high $T_g$ monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

When high $T_g$ monomers are included, the (meth)acrylate ester component may include up to 30 parts by weight, preferably up to 20 parts by weight of the (meth)acrylate ester monomer component. The $T_g$ of the resulting copolymer may be estimated by the Fox equation, as is known in the art.

In some embodiments the (meth)acrylic acid ester monomer component may comprise (meth)acrylate ester of 2-alkyl alkanols wherein the molar carbon number average of said 2-alkyl alkanols is 12 to 32. The Guerbet alkanol-derived (meth)acrylic monomers have the ability to form (co)polymers with unique and improved properties over comparable, commonly used PSA acrylate (co)polymers. These properties include a very low $T_g$, a low solubility parameter for acrylic polymers, and a low storage modulus creating a very conformable elastomer. This combination of properties provides PSAs with enhanced adhesion to low surface energy substrates as compared to current acrylic PSA compositions. When Guerbet monomers are included, the (meth)acrylate ester component may include up to 30 parts by weight, preferably up to 20 parts by weight of the (meth)acrylate ester monomer component. In other embodiments, the (meth)acrylate ester component may include up 99.5 parts of Guerbet monomers. Such Guerbet (meth)acrylate esters are described in Applicant's copending U.S. 2011-0237725 (Lewandowski et al.) and is incorporated herein by reference.

The copolymer optionally comprises an acid functional monomer, where the acid functional group may be an acid per se, such as a carboxylic acid, or a portion may be a salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids.

In some embodiments the (meth)acrylate copolymer contains no acid functional monomer units. The incipient amine group from photolysis of the photobase generator group may ionically crosslink with the acid groups. Further, the acid groups may adversely react with the amine-reactive functional groups of the crosslinking agent, thereby retarding the crosslinking reaction.

When present, the acid functional monomer is generally used in amounts of 0.5 to 10 parts by weight, preferably 0.5 to 5 parts by weight, based on 100 parts total monomer in the adhesive copolymer. As used herein the term "polar monomers" are exclusive of acid functional monomers.

The (meth)acrylate copolymer may optionally further comprise polar monomers. Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxyl)ethyl (meth)acrylate, 2-ethoxyethyl (meth)acrylate, 2-methoxyethoxyethyl (meth) acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

The polar monomer may be present in amounts of 0 to 15 parts by weight, preferably 0.1 to 10 parts by weight, most preferably 0.5 to 5 parts by weight, based on 100 parts by weight (meth)acrylate ester monomer. The polar monomers are selected to be non-reactive with the other components of the composition.

The (meth)acrylate copolymer may optionally further comprise other vinyl monomers. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 15 parts by weight, and when present, preferably 1 to 5 parts by weight, based on 100 parts by weight total monomer in the adhesive copolymer.

In order to increase cohesive strength of the coated adhesive composition, a multifunctional (meth)acrylate may be optionally incorporated into the blend of polymerizable monomers. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

Typically, the multifunctional (meth)acrylate is present in amounts less than 5 parts based on total dry weight of adhesive copolymer. More specifically, the multifunctional (meth)acrylate may be present in amounts from 0.01 to 5 parts, preferably 0.05 to 1 parts, based on 100 parts total monomers of the copolymer.

In the first embodiment, the crosslinkable composition further comprises a non-polymeric polyamine photobase generator of the formula:

where
$R^3$ is a photoactive group, $R^4$ is a hydrogen or alkyl group, $R^5$ is a hydrocarbyl group, including polyvalent alkyl or aryl group, and x is at least 2. More particularly $R^3$ may be selected from an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

The use of the photobase generator (PBG) groups overcomes a problem in the art by controlling the rate of crosslinking. It has been found that the (meth)acrylate copolymer can be crosslinked by polyfunctional compounds having amine-reactive functional groups. However, due to its high reactivity, the crosslinking reactions are very fast and uncontrollable; mixing an amine-functional (meth)acrylate copolymer and amine-reactive crosslinking agent can result in gelation. The use of a photobase generator (PBG) can create free amines upon UV irradiation. When a non-polymeric polyamine photobase generator is formulated with the (meth)acrylate copolymer, the mixture is very stable and easy to process (e.g., coating) without any gelation. UV irradiation of this formulation can generate free pendant amines which can form crosslinks by reacting with the crosslinking agent having amine-reactive functional groups.

The photobase generator groups are not specifically limited so long as the groups generate a pendant amine group directly or indirectly with light irradiation. Photobase generators useful in the present invention are any polymerizable monomers which liberate amines upon exposure to light, typically at a wavelength of about 270 to 420 nanometers, however other wavelengths may be suitable. The photobase generator includes groups that include an oxime ester, a benzyl carbamate, a benzoin carbamate, an O-carbamoylhydroxyamines, an O-carbamoyloximes, an aromatic sulfonamide, an N-arylformamide, or an 4-(ortho-nitrophenyl) dihydropyridine.

More specifically, suitable O-carbamoylhydroxylamines include compounds of the formula

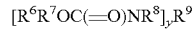

where $R^6$ and le are independently alkyl, aryl or acyl, $R^8$ is hydrogen or alkyl and $R^9$ is polyvalent alkyl or aryl, and y is at least 2.

Suitable O-carbamoyloximes include compounds of the formula $[R^{14}R^{15}C(=N)OC(=O)NR^8]_yR^9$ where $R^{14}$ and $R^{15}$ are independently hydrogen, alkyl or aryl, $R^8$ is alkyl or aryl, $R^9$ is alkylene or arylene having a valence of y, and y is at least 2.

Suitable sulfonamides include compounds of the formula $[ArS(=O)_2NR^8]_yR^9$ where Ar is an aryl group, $R^8$ is hydrogen or alkyl and $R^9$ is polyvalent alkyl or aryl and y is at least 2.

Suitable alpha-lactams include compounds of the formula (III):

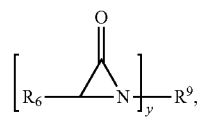

where $R^6$ is alkyl or aryl and $R^9$ is polyvalent alkyl or aryl, and y is at least 2.

Suitable N-(2-arylethenyl)amides include compounds of the structure IV:

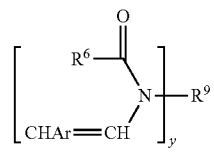

where Ar is an aryl group, $R^6$ is alkyl or aryl, $R^9$ is a polyvalent alkyl or aryl, and y is at least 2. Other amides also will be suitable, for example formanilide and other aryl substituted amides.

In the above described formulas, aryl is typically phenyl. As referred to in the above formulas, an alkyl group may be of a straight chain or branched configuration, or comprise a cyclic structure, and typically contains from 1 to 15 carbon atoms, more typically from 1 to 6 carbon atoms. An alkyl group is suitably either unsubstituted or substituted at one or more available positions. The substituents may be, for example, halo, aryl, or alkyl. Similarly, an aryl group also may be unsubstituted or substituted at one or more available positions by, for example, halo, aryl or alkyl.

Specifically preferred photobase generators include bis-2-hydroxy-2-phenylacetophenone N-cyclohexyl carbamate [i.e., [($C_6H_5$C(=O)CH($C_6H_5$)OC(=O)NH]$_2C_6H_{10}$], bis-o-nitrobenzyl N-cyclohexyl carbamate [o-$NO_2C_6H_5CH_2$OC(=O)NH]$_2C_6H_{10}$], bis-N-cyclohexyl-2-naphthalene sulfonamide [$C_{10}H_7SO_2$NH]$_2C_6H_{10}$], bis-3,5-dimethoxybenzyl N-cyclohexyl carbamate [($CH_3O)_2C_6H_5CH_2$OC(=O)NH]$_2$ $C_6H_{10}$], and bis-N-cyclohexyl p-toluene sulfonamide [p-$CH_3C_6H_5SO_2$NH]$_2C_6H_{10}$].

Preparation of photobase generator compounds is known in the art. For example, suitable benzyl carbamates can be prepared by the reaction of a diisocyanate with a benzyl alcohol in the presence of a suitable catalyst. Thus dibenzoin isophorone dicarbamate is prepared by reaction of benzoin with isophorone diisocyanate in a suitable solvent, typically with heating, and in the presence of a suitable catalyst such as DBDTL. Suitable solvents include ether and tetrahydrofuran. Photoactivation of this base generator provides isophoronediamine. See J. Cameron et al., J. Am. Chem. Soc., vol. 113, no. 11, 4303-4313 (1991); J. Cameron et al., J. Polym. Mater. Sci. Eng., 64, 55 (1991); and J. Cameron, et al., J. Org. Chem., 55, 5919-5922 (1990), all of which are incorporated herein by reference for their teaching of preparation of photobase generators. Bis-ortho-nitrobenzyl N-,N'-cyclohexylcarbamate can be prepared by reaction of cyclohexyldiisocyanate and 2-nitrobenzyl alcohol in a heated toluene solution until reaction completion. See U.S. Pat. No. 5,650,261 (Winkel), incorporated herein by reference for its teaching of photobase generators and the preparation thereof. The synthesis of sulfonamides is well known and generally involves reaction of a sulfonyl chloride with an amine. Thus N-,N'-cyclohexyl bis-p-toluenesulfonamide is prepared by reaction of p-toluenesulfonyl chloride and cyclohexyl diamine in a suitable solvent with heating.

Photobase generators are further described in M. Shirai et al. Photochemical Reactions of Quatenary Ammonium Dithiocarbamates as Photobase Generators and Their Use in The Photoinitiated Thermal Crosslinking of Poly(glycidylmethacrylate), Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996.

The use of a photobase generator may produce residue products from the photochemical production of base. Upon exposure to actinic radiation, the photobase generator will photolyze yielding a polyamine and a residue compound. For example, a bis-benzyl carbamate of a diamine will photolyze to yield the diamine and a phenyl ketone as the "residue of a photobase generator". Oxime esters will yield ketones. Such residues are present in small amounts and do not normally interfere with the desired adhesive properties of the resulting composition. The residues may be detected by conventional analytical techniques, such as infrared, ultraviolet and NMR spectroscopy, gas or liquid chromatography, mass spectroscopy, or a combination of such techniques. Thus, the present invention may comprise cured composition and detectable amounts of residues from a photobase generator.

Useful photobase generators may be derived from polyamines, including di- and higher amines. Useful polyamines are of the general formula $R^9$-(NR$^6$H)$_y$, where $R^6$ is H or alkyl, and $R^9$ is a polyvalent alkylene or arylene, and y is at least 2.

Useful polyamines can also be derived from polyamines having at least two amino groups, wherein two amino groups are primary, secondary, or a combination thereof. Examples include 1,10-diaminodecane, 1,12-diaminododecane, 9,9-bis (3-aminopropyl)fluorene, 2-(4-aminophenyl)ethylamine, 1,4-butanediol bis(3-aminopropyl) ether, N($CH_2CH_2NH_2$)$_3$, 1,8-diamino-p-menthane, 4,4'-diaminodicyclohexylmethane, 1,3-bis(3-aminopropyl)tetramethyldisiloxane, 1,8-diamino-3,6-dioxaoctane, 1,3-bis(aminomethyl)cyclohexane.

Examples of useful polyamines include polyamines having at least three amino groups, wherein the three amino groups are primary, secondary, or a combination thereof include $H_2N(CH_2CH_2NH)_2H$, $H_2N(CH_2CH_2NH)_3H$, $H_2N(CH_2CH_2NH)_4H$, $H_2N(CH_2CH_2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2CH_2NH)_2H$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5H(CH_2)_2NH(CH_2)_2NH_2$, and $N(CH_2CH_2NH_2)_3$.

The most preferred di- or polyamines include aliphatic diamines or aliphatic di- or polyamines and more specifically compounds with two primary amino groups, such as ethylene diamine, hexamethylene diamine, dodecanediamine, and the like.

Under the incident actinic radiation, the photobase generator of Formula II photolyzes yielding a polyamine ($R^9$—(NR$^6$H), where $R^6$ is H or alkyl, and $R^9$ is a polyvalent alkylene or arylene, and y is at least 2) and the residue of the photobase generator. The liberated amine adds nucleophilically to the reactive functional groups of the polyfunctional amine-reactive component to crosslink the system.

The compounds of Formula II for crosslinking of the amine-reactive (meth)acrylate copolymer may be provided in an amount wherein the number of equivalents of amine reactive groups is at least 25%, preferably at least 50%, and up to about 100%, relative to the number of equivalents of amine groups in the compounds of Formula II.

In a second embodiment, the disclosure provides a crosslinkable composition where polyfunctional amine-reactive component is a (meth)acrylate copolymer component having pendant amine-reactive functional groups and the polyamine photobase generator component is a (meth)acrylate copolymer having pendent amine photobase generator groups. The (meth)acrylate copolymer component having pendant amine-reactive functional groups is that described supra for the first embodiment.

In the second embodiment, the (meth)acrylate copolymer having pendent amine photobase generator groups may comprise a copolymer of interpolymerized monomer units including (meth)acrylate monomer units, photobase functional monomer units, optional acid-functional monomer units, optional non-acid functional, polar monomer units, optional vinyl monomer units and optional multifunctional (meth)acrylate monomer units.

More particularly, the photobase-functional (meth)acrylate copolymer may comprise:
1) 45 to 99.5 parts by weight, preferably 85 to 99.5 parts by weight, of an (meth)acrylic acid ester monomer units;
2) 0.5 to 15 parts by weight of photobase generator monomer units;
3) 0 to 10 parts by weight, preferably 0 to 5 parts by weight, of an acid functional monomer units;
4) 0 to 15 parts by weight of a second, non-acid functional, polar monomer units;

5) 0 to 15 parts vinyl monomer units, and
6) 0 to 5 parts by weight of multifunctional (meth)acrylate monomer units, where the sum of the monomer units is 100 parts by weight.

The photobase generator copolymers have the general structure $\sim[M^{ester}]_a[M^{PBG}]_b[M^{acid}]_c[M^{polar}]_d[M^{multi}]_e\sim$, where [$M^{ester}$] represents (meth)acrylate monomer units, [$M^{PBG}$] represents photobase monomer units, [$M^{acid}$] represent acid functional monomer units, [$M^{polar}$], represent non-acid polar monomer units, [$M^{multi}$] represent multifunctional (meth)acrylate monomer units, and the subscripts a to e represent the parts by weight of the respective monomer units in the adhesive copolymer, as previously described. The copolymer may be a block or random copolymer.

On exposure to light of a sufficient wavelength, the photobase generator group of the above copolymer photolyzes to provide a pendant amine. That is, all or a portion of the $M^{PBG}$ interpolymerized monomer units photolyze to $M^{AMINE}$ monomer units, providing a copolymer of the general formula $\sim[M^{ester}]_a[M^{AMINE}]_{b*}[M^{PBG}]_{b-b*}[M^{acid}]_c[M^{polar}]_d[M^{multi}]_e\sim$, where [$M^{AMINE}$] are the interpolymerized monomer units having a pendant amine group derived from photolysis of the photobase generator group. The subscript "b*" represents the parts by weight of the monomer unit in the adhesive copolymer. It will be appreciated that subscript b* will be equal to or less than subscript b and some photobase generator groups may remain. The pendant amine groups can crosslink the copolymer by addition or condensation reactions with the crosslinking agent having amine-reactive functional groups.

The ester, acid, polar and multifunctional monomer units are selected from those described for the (meth)acrylate copolymer having amine-reactive functional groups supra.

In the second embodiment, the crosslinkable composition further comprises interpolymerized monomer units having pendant photobase generator groups that on exposure to radiation, provides an amine. As previously described, the use of the photobase generator (PBG) groups overcomes a problem in the art by controlling the rate of crosslinking. It has been found that the (meth)acrylate copolymer can be crosslinked by polyfunctional compounds having amine-reactive functional groups. However, due to its high reactivity, the crosslinking reactions are very fast and uncontrollable; mixing an amine-functional (meth)acrylate copolymer and amine-reactive crosslinking agent can result in gelation. The use of a photobase generator (PBG) can create free amines upon UV irradiation. When a copolymer containing photobase generator monomer units is formulated with the (meth)acrylate copolymer, the mixture is very stable and easy to process (e.g., coating) without any gelation. UV irradiation of this formulation can generate free pendant amines which can form crosslinks by reacting with the crosslinking agent having amine-reactive functional groups.

The photobase generator groups are not specifically limited so long as the groups generate a pendant amine group directly or indirectly with light irradiation. Photobase generators useful in the present invention are any polymerizable monomers which liberate amines upon exposure to light, typically at a wavelength of about 270 to 420 nanometers, however other wavelengths may be suitable. The photobase generator includes groups that include an, oxime ester, a benzyl carbamate, a benzoin carbamate, an O-carbamoylhydroxyamines, an O-carbamoyloximes, an aromatic sulfonamide, an N-arylformamide, or an 4-(ortho-nitrophenyl)dihydropyridine.

The (meth)acrylate copolymer component further comprises monomer units having pendant amine photobase generator units. The (meth)acrylate copolymer having pendant amine photobase generators include interpolymerized units of monomers of the general formula:

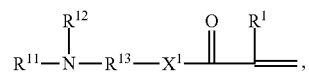

V wherein
$R^{11}$ it comprises a photolabile group that on exposure to light provides an amine group;
$R^{12}$ is H or a $C_1$-$C_4$ alkyl group;
$R^{13}$ is a (hetero)hydrocarbyl group, including divalent alkylene or arylene;
$X^1$ is —O—, —S— or —$NR^1$—, and
$R^1$ is H or $C_1$-$C_4$ alkyl.

The adhesive copolymer comprises 0.5 to 15 parts by weight, preferably 5 to 10 parts by weight, of photobase generator monomer units.

It will be understood that the formula represents a photobase generator monomer unit wherein the polymerized monomer units having a pendant amine liberated by photolysis of the formula:

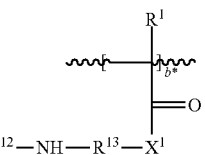

VI $R^{12}$ is H or a $C_1$-$C_4$ alkyl group;
$R^{13}$ is a (hetero)hydrocarbyl group, including divalent alkylene or arylene;
$X^1$ is —O— or —$NR^2$—, and
$R^1$ is H or $C_1$-$C_4$ alkyl, and subscript b* is the weight fraction of the monomer unit in the copolymer,
i.e. 0.5 to 15 parts by weight based on 100 parts of total monomer in the copolymer.

Useful ortho-nitrobenzyl carbamates include compounds of the formula:

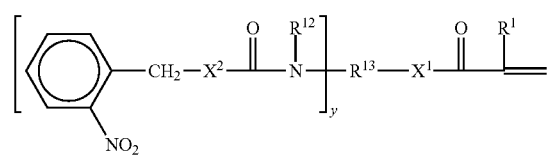

VII where
$R^{12}$ is hydrogen or alkyl,
$R^1$ is H or $C_1$-$C_4$ alkyl;
$X^1$ and $X^2$ are independently —O—, —$NR^1$— or —S—;
$R^{13}$ is polyvalent alkyl or aryl, and y is at least 1. It will be understood that the phenyl group may be further substituted by one or more lower alkyl and/or alkoxy groups.

More specifically, suitable O-carbamoylhydroxylamines include compounds of the formula

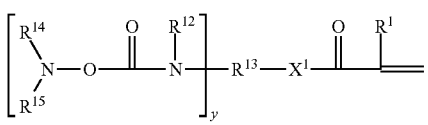

where
$R^{14}$ and $R^{15}$ are independently alkyl or aryl,
$R^{12}$ is hydrogen or alkyl,
$R^1$ is H or $C_1$-$C_4$ alkyl;
$X^1$ is —O—, —NR$^1$— or —S—;
$R^{13}$ is polyvalent alkyl or aryl, and y is at least 1.

Suitable O-carbamoyloximes include compounds of the formula:

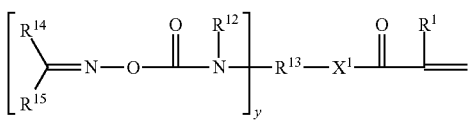

where
$R^{14}$ and $R^{15}$ are independently alkyl or aryl,
$R^{12}$ is hydrogen or alkyl,
$R^1$ is H or $C_1$-$C_4$ alkyl;
$R^{13}$ is polyvalent alkyl or aryl,
$X^1$ is —O—, —NR$^1$— or —S—;
and y is at least 1.

Suitable sulfonamides include compounds of the formula

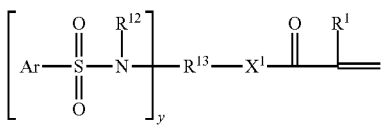

where Ar is an aryl group,
$R^{12}$ is hydrogen or alkyl,
$R^1$ is H or $C_1$-$C_4$ alkyl;
$R^{13}$ is polyvalent alkyl or aryl,
$X^1$ is —O—, —NR$^1$— or —S—;
and y is at least 1.

Other amides also will be suitable, for example formanilide and other aryl substituted amides. In the above described formulas, aryl is typically phenyl. As referred to in the above formulas, an alkyl group may be of a straight chain or branched configuration, or comprise a cyclic structure, and typically contains from 1 to 15 carbon atoms, more typically from 1 to 6 carbon atoms. An alkyl group is suitably either unsubstituted or substituted at one or more available positions. The substituents may be, for example, halo, aryl, or alkyl. Similarly, an aryl group also may be unsubstituted or substituted at one or more available positions by, for example, halo, aryl or alkyl.

The polymerizable photobase generators may be prepared by the reaction of a polymerizable ethylenically-unsaturated compound having a reactive isocyanate functional group with a photolabile compound having co-reactive amine or hydroxyl functional group. For example, the polymerizable photobase generators may be prepared by the reaction between a polymerizable ethylenically-unsaturated isocyanate functional compound with a photolabile compound having a reactive isocyanate reactive functionality. The isocyanate co-reactive functionality of the photolabile compound may comprise an alcohol or amine functional group.

Preferred isocyanate-functional monomers include isocyanatoalkyl esters of ethylenically unsaturated carboxylic acids such as 2-isocyanatoethyl methacrylate and 2-isocyanatoethyl acrylate; acryloyl isocyanates such as methacryloyl isocyanate, and other ethylenically-unsaturated isocyanate functional monomers such as those described in U.S. Pat. No. 5,130,347 (Mitra). Of these isocyanate functional monomers, 2-isocyanatoethyl methacrylate (IEM) is preferred due to its availability. It will be apparent to one skilled in the art that many pairs of electrophilic and nucleophilic functional groups may be used in the preparation of the polymerizable photobase monomers.

Suitable benzyl carbamates can be prepared by the reaction of an isocyanate-functional (meth)acrylate (such as isocyanatoalkyl (meth)acrylate) with a suitable benzyl alcohol in the presence of a suitable catalyst. Thus o-nitrobenzylcarbamate (meth)acrylate photobase monomers may be prepared by the reaction of 2-nitrobenzyl alcohol with an isocyanatoalkyl (meth)acrylate, neat or in a suitable solvent, typically with heating, and in the presence of a suitable catalyst. Suitable solvents include ether and tetrahydrofuran. Photoactivation of this base generator provides a copolymer having a pendant alkyl amine group.

The use of a photobase generator may produce residue products from the photochemical production of base. Upon exposure to actinic radiation, the photobase generators will photolyze yielding a pendant amine-functional copolymer and a residue compound as previously described. For example, monomer unit having a pendant benzyl carbamate of an amine will photolyze to yield the pendant amine group and a phenyl ketone as the "residue of a photobase generator". Oxime esters, O-carbamoylhydroxyamines, O-carbamoyloximes, and benzoin carbamates will yield ketones as residues. Benzyl carbamates will yield benzyl alcohols as residues. Ortho-nitrobenzyl carbamates will yield ortho-nitrosobenzaldehyde as a residue. Aromatic sulfonamides will yield the aromatic hydrocarbon moiety that was originally bonded to the sulfonyl group as a residue. Such residues are present in small amounts and do not normally interfere with the desired adhesive properties of the resulting copolymer. The residues may be detected by conventional analytical techniques, such as infrared, ultraviolet and NMR spectroscopy, gas or liquid chromatography, mass spectroscopy, or a combination of such techniques. Thus, the present invention may comprise cured (meth)acrylate adhesive copolymer and detectable amounts of residues from a photobase generator.

The compounds of Formula XI for crosslinking of the photobase (meth)acrylate copolymer may be provided in an amount wherein the number of equivalents of amine reactive groups is at least 25%, preferably at least 50%, and up to about 100%, relative to the number of equivalents of amine groups in the (meth)acrylate copolymer.

In a third embodiment, the disclosure provides a crosslinkable composition where polyfunctional amine-reactive component is a non-polymeric component having a plurality of amine-reactive functional groups and the polyamine photobase generator component is a (meth)acrylate copolymer having pendent amine photobase generator groups. The (meth)acrylate copolymer component having pendant amine photobase groups is that described supra for the second embodiment.

The non-polymeric component having a plurality of amine-reactive functional groups for the (meth)acrylate copolymer having photobase generator groups, including ketone, aldehyde, ester, acyl halide, isocyanate, epoxide, anhydride, or azlactone groups. Preferably the amine-reactive functional groups are selected to react with the amine groups generated by the photobase copolymer at temperatures below about 50° C., preferably below 25° C. such that the crosslinking reaction takes place during the coating and drying operation.

Such crosslinking agents may have the general formula XI:

$$R^{16}—(Z)_w \qquad \text{XI}$$

where $R^{16}$ is a (hetero)hydrocarbyl group, Z is an amine-reactive group and w is ≥2, preferably 2-4. The $R^{16}$ group may be an alkylene group, an arylene group, a heteroarylene group, a heteroalkylene group, an aralkylene group, or a combination thereof.

In one embodiment the amine-reactive Z group may be an epoxy group and include both aliphatic and aromatic polyepoxides. Representative examples of aliphatic polyepoxides include 3',4'-epoxycyclohexylmethyl-3,4-epoxycyclohexanecarboxylate, 3,4-epoxycyclohexyloxirane, 2-(3',4'-epoxycyclohexyl)-5,1"-spiro-3",4"-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol, ethylene glycol, polyethylene glycol or butanediol. Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-[4-(2,3-epoxypropoxyl)phenyl]propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'dihydroxydiphenyl dimethyl methane, 4,4'-dihydroxy-3,3'-dimethyldiphenyl methane, 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, the descriptions of which are incorporated herein by reference, as well as the derivatives described in the Handbook of Epoxy Resins by Lee and Neville, McGraw-Hill Book Co., New York (1967), and mixtures thereof.

In one embodiment the amine reactive functional group Z may be an isocyanate group. Suitable polyisocyanates include organic compounds containing at least two free isocyanate groups. Diisocyanates of the formula $R^{16}(NCO)_2$ are preferably used wherein $R^{16}$ denotes an aliphatic hydrocarbon group with 4 to 20 carbon atoms, a cycloaliphatic hydrocarbon group with 6 to 20 carbon atoms, an aromatic hydrocarbon group with 6 to 20 carbon atoms or an araliphatic hydrocarbon group with 7 to 20 carbon atoms.

Examples of diisocyanates include tetramethylene diisocyanate, hexamethylenediisocyanate (HDI), dodecamethylenediisocyanate, 1,4-diisocyanatocyclohexane, 1-isocyanato-3,3,5-trimethyl-5-isocyanatomethylcyclohexane (IPDI), 4,4' diisocyanato-dicyclohexylmethane (HMDI), 4,4'-diisocyanato-2,2-dicyclohexyl-propane, 1,4-diisocyanatobenzene, 2,4-diisocyanatotoluene (TDI), 2,6 diisocyanatotoluene, 4,4'-diisocyanatodiphenylmethane (MDI), m- and p xylylenediisocyanate, α, α, α', α'-tetramethyl-m- and p-xylylenediisocyanate and mixtures of these compounds. Suitable polyisocyanates also include triisocyanates such as 1,3,5 triisocyanatocyclohexane-s-trione, trimethylhexylene diisocyanate, isocyanurate and biuret derivatives of HDI and MDI.

In one embodiment the amine reactive functional group Z may be an azlactone group. Reference may be made to Table 1 of a review entitled "Polyazlactones" by J. K. Rasmussen, et al., Encyclopedia of Polymer Science and Engineering, Second Edition, Volume 11, 1988, pp. 558-571 that contains a listing of reported bis(azlactones). Other poly azlactone functional materials are described in U.S. Pat. No. 7,556,858 (Rasmussen et al.), incorporated herein by reference.

In one embodiment the amine reactive functional group Z may be an aldehyde or ketone group. Examples include bis- and polyaldehydes, such as glyoxal or glutaraldehyde.

In some embodiments the crosslinking agent may be a polyacyl compound where Z is an ester, acid, acid halide or anhydride group. Esters and acids are less preferred due to the reduced reactivity. Representative examples of suitable diacyl compounds, as the corresponding esters, halides, acids, and anhydrides: azelaic; maleic; fumaric; itaconic; 1,5-pent-2-enedioic; adipic; 2-methyleneadipic; 3-methylitaconic; 3,3-dimethylitaconic; sebacic; suberic; pimelic; succinic; benzylsuccinic; sulfosuccinic; glutaric; 2-methyleneglutaric; 2-sulfoglutaric; 3-sulfoglutaric; diglycolic; dilactic; 3,3'-(ethylenedioxy)dipropionic; dodecanedioic; 2-sulfododecanedioic; decanedioic; undecanedicarboxylic; hexadecanedicarboxylic; dimerized fatty acids (such as those obtained by the dimerization of olefinically unsaturated monocarboxylic acids containing 16 to 20 carbon atoms, for example, oleic acid and linoleic acid and the like); 1,2-, 1,4-, and 1,6-cyclohexanedicarboxylic; norbornenedicarboxylic; bi-cyclooctanedicarboxylic; and other aliphatic, heteroaliphatic, saturated alicyclic, or saturated heteroalicyclic dicarboxylic acids; and the like; and mixtures thereof. Salts (for example, alkali metal salts) of the above-described sulfonic acids can also be used.

The compounds of Formula XI for crosslinking of the photobase (meth)acrylate copolymer may be provided in an amount wherein the number of equivalents of amine reactive groups Z is at least 25%, preferably at least 50%, and up to about 100%, relative to the number of equivalents of amine groups in the (meth)acrylate copolymer.

In a fourth embodiment the disclosure provides a crosslinkable composition where polyfunctional amine-reactive component and the polyamine photobase generator component are a single component comprising a (meth)acrylate copolymer having pendent amine photobase generator groups and pendent amine-reactive functional groups.

In such embodiments, the (meth)acrylate copolymer comprises:

i. 45 to 99 parts by weight of an (meth)acrylic acid ester of non-tertiary alcohol;
ii. 0.5 to 15 parts by weight of ethylenically unsaturated monomer units having pendent amine photobase generator groups;
iii. 0.5 to 15 parts by weight of ethylenically unsaturated monomer units having pendent amine-reactive functional group;
iv. 0 to 10 parts by weight of an acid functional ethylenically unsaturated monomer;
v. 0 to 10 parts by weight of a non-acid functional, ethylenically unsaturated polar monomer;

vi. 0 to 5 parts vinyl monomer; and
vii. 0 to 5 parts of a multifunctional (meth)acrylate;
based on 100 parts by weight total monomer.

The (meth)acrylate copolymer may be represented as:

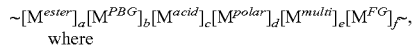

where $[M^{ester}]$ represents (meth)acrylate monomer units, $[M^{PBG}]$ represents photobase monomer units, $[M^{acid}]$ represent acid functional monomer units, $[M^{polar}]$, represent non-acid polar monomer units, $[M^{multi}]$ represent multifunctional (meth)acrylate monomer units, $[M^{FG}]_f$ represent the monomer units having amine-reactive functional groups, and the subscripts a to f represent the parts by weight of the respective monomer units in the adhesive copolymer.

One skilled in the art will also recognize that non-polymeric compounds have both amine photobase generator groups and amine-reactive functional groups may be useful.

In each embodiment, the (meth)acrylate copolymer components may be prepared by exposing the component monomers to energy in the presence of an initiator, such as a thermal or photoinitiator. The polymerizations may be conducted in the presence of, or preferably in the absence of, suitable solvents such as ethyl acetate, toluene and tetrahydrofuran which are unreactive with the functional groups of the component (meth)acrylate co polymer(s).

The composition may be polymerized with either a thermal initiator or photoinitiator. Any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis(isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO™ 64 (2,2'-azo-bis(isobutyronitrile)) and VAZO™ 52 (2,2'-azo-bis(2,2-dimethyvaleronitrile)), and Lucidol™ 70 from Elf Atochem North America, Philadelphia, Pa.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (Ciba Specialty Chemicals), or as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

It will be understood that useful photoiniaters include those having an absorbance spectrum distinct and separate from those frequencies that would trigger the photobase generator group. Should the absorbance spectra of the photoinitiator and the photobase generator group overlap, initiation of monomer polymerization would concurrently initiate photolysis of the photobase generator group, leading to premature gellation. As a useful illustration, a nitrobenzyl photobase generator group absorbs and photolyzes in the range of 260-345 nm. One may select a photoinitiator having an absorbance maximum outside this range, such as Irgacure™ 819 having an absorbance range of 350-450. Different combinations of photobase generator groups and photoinitiators may be used.

These thermal and photoinitiators can be employed in concentrations ranging from about 0.0001 to about 3.0 pbw, preferably from about 0.001 to about 1.0 pbw, and more preferably from about 0.005 to about 0.5 pbw, per 100 pbw of the monomers.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers.

The curable composition may also be prepared by a syrup polymerization technique. "Syrup polymer composition" refers to a solution of a solute polymer in one or more solvent monomers, the composition having a viscosity of from 500 to 10,000 cPs at 22° C. Here, a monomer mixture consisting of the (meth) acrylate monomer, the acid functional monomer, optionally the polar monomer and vinyl monomer, but lacking the photobase generator monomer are combined and partially polymerized using a thermal- or photoinitiator. The resulting syrup polymer, comprising a (meth)acrylate solute copolymer and unreacted solvent monomers, is then combined with the photobase generator monomer and photoinitiator. Subsequent treatment with UV radiation will simultaneously polymerize the solvent monomers (including the photobase monomer) and photolyze the photobase generator group to yield a pendant amine. Alternatively, the photoinitiator and photobase generator groups may be chosen to have non-overlapping absorbances so that the photoinitiator may be initiated at a first frequency range to polymerize the solvent monomers, and the photobase generator subsequently photolyzed at a second frequency range.

If desired, a chain transfer agent may be added to the monomer mixture to produce a copolymer having the desired molecular weight. The chain transfer agent should be selected as to be non-reactive with the other components of the composition; i.e. will not add or condense with the other components Examples of useful chain transfer agents include but are not limited to those selected from the group consisting of carbon tetrabromide, alcohols, mercaptans, and mixtures thereof. A particularly useful class of non-reactive chain transfer agents includes the methacrylate dimers and trimers described in Moad, C. L.; Moad, G.; Rizzardo, E.; and Thang, S. H. *Macromolecules*, 1996, 29, 7717-7726, and in Applicant's copending application U.S. Ser. No. 13/169,306, incorporated herein by reference. When present, the preferred chain transfer agents are isooctylthioglycolate, the methacrylate dimers and trimers and carbon tetrabromide. The monomer mixture may further comprise up to about 5 parts by weight of a chain transfer agent, typically about 0.01 to about 5 parts by weight, if used, preferably about 0.5 parts by weight to about 3 parts by weight, based upon 100 parts by weight of the total monomer mixture.

The pressure sensitive adhesives may also contain one or more conventional additives. Preferred additives include tackifiers, plasticizers, dyes, antioxidants, and UV stabilizers. Such additives can be used if they do not affect the superior properties of the pressure sensitive adhesives.

If tackifiers are used, then up to about 100 parts by weight, preferably less than 75% by weight, and more preferably less than 50% by weight based on 100 parts by weight total adhesive polymer would be suitable. In some embodiments no tackifiers may be used. Suitable tackifiers for use with (meth) acrylate polymer dispersions include rosin acids, rosin esters, such as glycerol esters of rosin and pentaerythritol esters of rosin, terpene phenolic resins, hydrocarbon resins including hydrogenated hydrocarbon resins, and cumarone indene resins. The type and amount of tackifier can affect properties such as contactability, bonding range, bond strength, heat resistance and specific adhesion.

The adhesive composition of the present invention may contain a plasticizer, if desired. The plasticizer softens the adhesive, and as a result, the substrate is more easily wetted by the adhesive. Further, the use of a plasticizer may improve the adhesive properties, including peel and shear. The plasticizer may be hydrophobic oils, hydrophilic or a combination thereof. The plasticizer can be added in an amount ranging from about 0.1 to about 20 weight percent of the adhesive composition and preferably from about 0.5 to about 10 weight percent.

Useful plasticizers are compatible with the acrylic pressure sensitive adhesive, such that once the plasticizer is mixed into the acrylic pressure sensitive adhesive, the plasticizer does not phase separate from the pressure sensitive adhesive. By "phase separation" or "phase separate," it is meant that by differential scanning calorimetry (DSC) no detectable thermal transition, such as a melting or glass transition temperature can be found for the pure plasticizer in the plasticized adhesive composition. Some migration of the plasticizer from or throughout the plasticized adhesive can be tolerated, such as minor separation due to composition equilibrium or temperature influences, but the plasticizer does not migrate to the extent that phase separation occurs between the adhesive and the plasticizing agent. Plasticizer compatibility with the adhesive can also be dependent upon the chemical nature of the plasticizer and the monomeric content of the adhesive.

For non-aqueous compositions oil soluble species such as phthalates (e.g. dioctyl adipate, and bis 2-ethylhexyl adipate), citrates (e.g. trihexyl citrate and trioctyl citrate), adipates (e.g. dioctyl phthalate, and bis 2-ethylhexyl phthalate) and maleates (e.g. dibutyl maleate) may be used.

Adhesive articles may be prepared by coating the adhesive or pre-adhesive composition on a suitable support, such as a flexible backing. Examples of materials that can be included in the flexible backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly (ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary.

EXAMPLES

As used herein, all percentages are by weight unless otherwise specified. Nuclear Magnetic Resonance (NMR) analyses were performed on a 500 MHz Ultrashield Plus instrument, Bruker AXS Inc.; Madison, Wis. Infrared (IR) spectroscopy and analysis were performed on a Nexus 670 FT-1R E.S.P. instrument, Thermo Nicolet Corp.; Madison, Wis.

Test Methods
180° Peel Adhesion Test (Peel)

A test sample was prepared by placing a 0.5 (12.2 cm) inch wide by 7 inch (178 cm) long adhesive coated tape on a 100 cm by 250 cm glass or stainless steel plates, as specified in the examples. The plates were cleaned by wiping with isopropanol before testing. The tape was rolled down onto the panel with two passes of a 2 kg roller. The test was conducted on a slip/peel tester (Instrumentors Inc.; Strongsville, Ohio). The tape was removed from the plate at a peel angle of 180° and a platen speed of 12 inches per minute (0.305 m/min) for a total of 10 seconds. The force required to remove the tape was measured in ounces per 0.5 inch and converted to Newtons/decimeter (N/dm). Results are the average of two tests on each adhesive.

Static Shear Strength Test (Shear) at Room Temperature (RT)

A test sample was prepared by placing a 0.5 inch by 2 inch strip of adhesive coated tape on the edge of a stainless steel panel that had been cleaned with isopropanol. The tape overlapped the panel by 0.5 inch by 1 inch, leaving a 1 inch by 0.5 inch portion of the tape off of the panel. The tape was rolled down onto the panel using two passes of a 2 kg roller. A 1000 gram weight was attached to the free end of the tape and the sample was hung vertically until failure occurred, i.e., the weight fell from the plate, or the test was terminated at 10,000 minutes. The time to failure or 10,000 minutes, if no failure occurred, was recorded. The mode of failure (FAILURE) was also noted as cohesive (C) in which the adhesive splits internally, leaving residue on both the panel and the tape backing); adhesive (A) in which the adhesive peels substantially cleanly from either the tape backing or the panel); or no failure (--). Results are the average of two or three test on each adhesive.

Static Shear Strength Test (Shear) at High Temperature (70° C.)

Test samples were prepared as for the room temperature shear test except that a 500 gram weight was attached to the tape end, and samples were hung vertically in an oven set at 70° C. until failure or the test was terminated.

Preparation of 2-({[(2-nitrobenzyl)oxy]carbonyl}amino)ethyl 2-methylacrylate (NBMA)

A composition was prepared by mixing 14.4 g (94 mmol) of 2-nitrobenzyl alcohol (Alfa Aesar; Ward Hill, Mass.), 14.6 g (94 mmol) of isocyanatoethyl methacrylate (Aldrich; Milwaukee, Wis.) and 1 drop of dibutyltin dilaurate (Alfa Aesar) in a 4 ounce glass jar. The jar was sealed and placed in an oven set at 70° C. for 2 hours. Analysis of the reaction mixture by infrared (IR) spectroscopy (Nexus 670 FT-IR E.S.P., Thermo Nicolet Corp.; Madison, Wis.) showed no absorbance at 2250 cm$^{-1}$, indicating substantially no remaining isocyanate functionality. To the cooled reaction mixture were added 40 mL of toluene and the jar was placed in a refrigerator overnight. The next day, white crystals that had formed were filtered off and dried to provide 26.9 g of 2-({[(2-nitrobenzyl)oxy]carbonyl}amino)ethyl 2-methylacrylate (NBMA). The structure of the product was confirmed by NMR and IR spectroscopy analyses.

Preparation of Bis Nitrobenzyl Carbamate (BNBC)

A composition was prepared by mixing 6.1 g (40 mmol) of 2-nitrobenzyl alcohol, 4.2 g (20 mmol) of trimethylhexamethylene diisocyanate having a mixture of 2, 2, 4- and 2, 4, 4-isomers (TCI America; Portland, Oreg.) and 1 drop of dibutyltin dilaurate in a 4 ounce glass jar. The jar was sealed and placed in an oven set at 70° C. for 2 hours. Analysis of the reaction mixture. at by IR spectroscopy showed no absorbance at 2250 cm$^{-1}$, indicating substantially no remaining isocyanate functionality. NMR and IR spectroscopy analyses of the product, a viscous light yellow oil, were consistent with the structure of bis nitrobenzyl carbamate.

Preparation of Tris Nitrobenzyl Carbamate (TNBC)

A composition was prepared by mixing 5.1 g (33 mmol) of 2-nitrobenzyl alcohol, 6.0 g (11 mmol) of triisocyanate (Tolonate HDT, Perstorp; Cranbury, N.J.) and 1 drop of dibutyltin dilaurate in a 4 ounce glass jar. The jar was sealed and placed in an oven set at 70° C. for 2 hours. Analysis of the reaction mixture by IR spectroscopy showed no absorbance at 2250 cm$^{-1}$, indicating substantially no remaining isocyanate functionality. NMR and IR spectroscopy analyses of the product, a viscous light yellow oil, were consistent with the structure of tris nitrobenzyl carbamate.

Preparation of 2-vinyl-4,4-dimethyl-5-oxazolone (VDM)

A reactive monomer, 2-vinyl-4,4-dimethyl-5-oxazolone, was prepared according to the procedure described in S. M. Heilmann et al., Journal of Polymer Science: Polymer Chemistry Edition, 22, 3149-3160 (1984).

Preparation of Addition-fragmentation Chain Transfer Agent (AFM)

A methyl methacrylate oligomer mixture was prepared according to the procedure described in Example 1 of U.S. Pat. No. 4,547,323 (Carlson, G. M.) and as described in Moad, C. L.; Moad, G.; Rizzardo, E.; and Thang, S. H. *Macromolecules*, 1996, 29, 7717-7726.

Example 1

A composition was prepared by adding 70 g of IOA (isooctyl acrylate), 16.6 g of IBoA (isobornyl acrylate), 0.88 g GMA (glycidyl methacrylate), 1.91 g NBMA, and 88 mg initiator (2,2'-azobis(2-methylbutyronitrile (Vazo 67); Dupont; Wilmington, Del.) to a 16 ounce amber jar containing 160 g of ethyl acetate. The jar was sparged with nitrogen for 15 minutes, capped, and placed in a laundrometer (Atlas, Inc. Athens, Ga.) at 60° C. two days. The resulting adhesive polymer solution was allowed to cool to room temperature.

Examples 2-4

The adhesive polymer solution of Example 1 was knife coated onto a the primed side of a primed PET film (Mitsubishi Hostaphan™ 3SAB Polyester Film, Mitsubishi Polyester Film Inc.; Greer, S.C.). The coated films were placed in oven set at 100° C. for at least about 30 minutes to form pressure sensitive adhesive coated films with about a 2 to 3 mil (~50-75 micrometers) thick adhesive layers. The adhesive coated films were exposed to UV radiation (Sylvania Blacklight F40/3508L) at the UV exposures (Dose) shown in Table 1. The films were cut into adhesive tapes and tested for Peel Adhesion (Peel) on glass, and static shear strength (Shear) on stainless steel at room temperature (RT) and at 70° C. Results are shown in Table 1.

TABLE 1

| Ex | UV Dose (mJ/cm$^2$) | Peel (N/dm) | Shear RT | | Shear 70° C. | |
|---|---|---|---|---|---|---|
| | | | (min) | Failure | (min) | Failure |
| 2 | 1300 | 44 | 4238 | C | +10,000 | — |
| 3 | 545 | 71 | 7 | C | 1 | C |
| 4 | None | 0 | 2 | C | 1 | C |

Example 5

An adhesive polymer solution was prepared as in Example 1 except that 0.88 g of VDM was used instead of the GMA in the composition.

Examples 6-9

Pressure sensitive adhesive tapes were prepared and tested as described in Examples 2-4 except using the adhesive polymer solution of Example 5, and the adhesive films were exposed to a UV lamp (Fusion UV Systems INC.; Gaithersburg, Md.) having a quartz UV H bulb at the doses shown in Table 2. Peel and Shear test results are also shown in Table 2.

TABLE 2

| Ex | UV Dose (mJ/cm$^2$) | Peel (N/dm) | Shear RT | | Shear 70° C. | |
|---|---|---|---|---|---|---|
| | | | (min) | Failure | (min) | Failure |
| 6 | 200 | 32 | 244 | C | +10,000 | — |
| 7 | 400 | 21 | +10,000 | — | +10,000. | — |
| 8 | 600 | 20 | +10,000 | — | +10,000 | — |
| 9 | None | 150 | 2 | C | 0 | — |

Example 10

An adhesive polymer solution was prepared as in Example 1 except that no GMA was added and 0.96 g of NBMA was used in the composition instead of 1.91 g. After the polymer solution was cooled to room temperature, 0.39 g of an epoxy functional crosslinker (3,4 epoxy cyclohexyl methyl 3, 4 epoxy cyclohexyl carboxylate (ERL 4221), Polysciences; Warrington, Pa.) was added to in the jar. The jar was capped and mixed on a roller mill for about an hour.

Example 11-15

Adhesive tapes were prepared and tested as described in Examples 6 9 except that the adhesive polymer solution of Example 10 was used, and the adhesive coated films were exposed to the UV doses shown in Table 3. Peel and Shear test results are also shown in Table 3.

TABLE 3

| Ex | UV Dose (mJ/cm$^2$) | Peel (N/dm) | Shear RT (min) | Shear RT Failure | Shear 70° C. (min) | Shear 70° C. Failure |
|---|---|---|---|---|---|---|
| 11 | 1200 | 26 | +10,000 | — | +10,000 | — |
| 12 | 800 | 28 | +10,000 | — | +10,000 | — |
| 13 | 400 | 44 | +10,000 | — | +10,000 | — |
| 14 | 200 | 45 | 119 | C | 14 | C |
| 15 | None | 133 | 1 | C | 1 | C |

Examples 16-19

A composition for Example 16 was prepared by mixing IOA, AA (acrylic acid; Alfa Aesar), and VDM in the amounts by weight percent (%) shown in Table 4 in an amber jar. The reactants (IOA, AA, and VDM) total 100% of the polymer material. Based on 100 wt % polymer material, 0.1 wt % of a photoinitiator (2-dimethoxy-2-diphenylethanone (IRGA-CURE 651); Ciba Specialty Chemicals; Tarrytown, N.Y.) and 0.015 wt % IOTG (iso-octyl thioglycolate; Aldrich) were added to the jar and mixed. A pouch was formed by heat-sealing the edges of two pEVA films (0.065 mm thick EVA film (VA-24); Flint Hills Resources; Wichita, Kans.). The weight of the pouch was approximately 1.4 grams. A 28-gram portion of the composition was added to the pouch, taking care to avoid and eliminate air bubbles. The pouch was sealed and immersed in a constant temperature water bath set at 17° C. and irradiated with ultraviolet light (Sylvania Blacklight 350 nm) for eight minutes on each side to polymerize the composition. The resulting product was a polymerized adhesive contained in the pouch.

Compositions for Examples 17-19 were prepared by mixing IOA, BA (butyl acrylate; Aldrich), IBoA, HBAGE (4-hydroxybutyl acrylate glycidylether; Nippon Kasei; Tokyo, Japan) and NBMA in an amber jar in the amounts shown in Table 4. Based on 100% by weight of the polymer reactants (IOA, BA, IBoA, HBAGE, NBMA) 0.2% photoinitiator (Bis (2,4,6-trimethylbenzoyl)-phenylphosphineoxide (IRGA-CURE 819); Ciba Specialty Chemicals) and 0.1% AFM were added to the jar and mixed. The compositions were sealed in pouches and polymerized as in Example 16 except that pouches were irradiated with high intensity visible blue lights (Sylvania Super Blue F40T12) that have an output intensity centered at 430 nm.

TABLE 4

| Ex | % IOA | % BA | % IBOA | % AA | % VDM | % HBAGE | % NBMA |
|---|---|---|---|---|---|---|---|
| 16 | 90 | 0 | 0 | 7 | 3 | 0 | 0 |
| 17 | 45 | 42.5 | 5 | 0 | 0 | 5 | 2.5 |
| 18 | 45 | 45 | 0 | 0 | 0 | 5 | 5 |
| 19 | 46 | 45 | 5 | 0 | 0 | 2.5 | 1.5 |

Examples 20-26

Pressure sensitive adhesive compositions shown in Table 5 were prepared by mixing the pouches with adhesive from Examples 17, 18, and 19. The pouches were mixed in a high temperature mixer (Half Size Mixer; C. W. Brabender; Hackensack, N.J.) for 5 minutes at 100 revolutions per minute at 145° C. The mixing chamber was then cooled to 100° C. and the rotation of the mixing paddles was reversed to expel and collect the adhesive material which was allowed to cool. Tackifier resins in Examples 22-26 were added to the adhesive melt in the mixer and mixed for another 10 minutes before expelling and cooling. The tackifier resins used were a hydrogenated rosin ester (Foral 85E; Eastman Chemical Co.; Kingsport Tenn.) and a hydrocarbon resin (Escorez 2520; Exxon Mobile Chemical Co.; Houston, Tex.).

An adhesive construction was prepared by placing approximately 1.5 grams of the adhesive material between the primed surface of a PET film (Hostaphan™ 3SAB film) and a silicone treated release liner (Silphan S36; Siliconature SPA; Godega di Sant'Urbano, Italy). The construction was placed between the plates of a heated press (Carver, Inc.; Wabash, Ind.) with the plate temperatures set at 80° C. The construction was compressed until the adhesive material was approximately 0.2 millimeters thick. The release liner was removed and the coated adhesive film was passed under a UV lamp using a quartz UV H bulb that delivered the UV doses shown in Table 5. The adhesive film was then cut into 0.5" by 6" strips and tested for Shear on stainless steel at 70° C., and Peel on stainless steel. Results are shown in Table 5

TABLE 5

| Ex | Adhesive/g | Foral 85E (g) | Escorez (g) | UV Dose (mJ/cm$^2$) | Shear 70° C. (min) | Peel (N/dm) |
|---|---|---|---|---|---|---|
| 20 | Ex 17/27 | 0 | 0 | 0 | 3 | NM |
| 21 | Ex 17/27 | 0 | 0 | 1200 | +10,000 | 18 |
| 22 | Ex 17/14 | 12.6 | 1.4 | 1200 | +10,000 | 27 |
| 23 | Ex 18/18.76 | 8.4 | 0.84 | 1200 | +10,000 | 3 |
| 24 | Ex 18/14 | 12.6 | 1.4 | 1200 | +10,000 | 11 |
| 25 | Ex 19/18.76 | 8.4 | 0.84 | 1200 | +10,000 | 12 |
| 26 | Ex 19/14 | 12.6 | 1.4 | 1200 | 7 | NM |

NM: Not measured

Examples 27-37

Pressure sensitive adhesive compositions were prepared as in Examples 22-26 except using pouches of adhesive from Example 16, and either BNBC or TNBC, and optional tackifier resins in the amounts shown in Table 6. The BNBC, TNBC, and optional tackifier resins were added to the adhesive melt and mixed for another 10 minutes before expelling the composition.

TABLE 6

| Ex | Adhesive (g) | BNBC (g) | TNBC (g) | Foral (g) | Escorez (g) | UV Dose (mJ/cm$^2$) | Shear 70° C. (min) | Peel (N/dm) |
|---|---|---|---|---|---|---|---|---|
| 27 | 27 | 0.5 | 0 | 0 | 0 | 0 | 5 | NM |
| 28 | 27 | 0.5 | 0 | 0 | 0 | 900 | 28 | NM |
| 29 | 27 | 0.5 | 0 | 0 | 0 | 1200 | 54 | NM |
| 30 | 27 | 0 | 0.35 | 0 | 0 | 900 | 41 | NM |
| 31 | 27 | 0 | 0.35 | 0 | 0 | 1200 | 282 | NM |
| 32 | 27 | 0 | 1.0 | 0 | 0 | 1500 | +10,000 | 50 |
| 33 | 20.7 | 0 | 1.0 | 6.44 | 0.84 | 1200 | 11 | NM |

TABLE 6-continued

| Ex | Adhesive (g) | BNBC (g) | TNBC (g) | Foral (g) | Escorez (g) | UV Dose (mJ/cm$^2$) | Shear 70° C. (min) | Peel (N/dm) |
|---|---|---|---|---|---|---|---|---|
| 34 | 27 | 0 | 1.0 | 0 | 0 | 600 | 1680 | 30 |
| 35 | 27 | 0 | 1.0 | 0 | 0 | 1200 | +10,000 | 23 |
| 36 | 27 | 0 | 1.0 | 0 | 0 | 1500 | +10,000 | 27 |
| 37 | 20 | 0 | 0.7 | 8.68 | 1.12 | 1500 | +10,000 | 53 |

NM: Not Measured

What is claimed is:

1. A crosslinkable composition comprising:
   a) a polyfunctional amine-reactive component,
   b) a polyamine photobase generator component comprising a (meth)acrylate copolymer of:
      i. 45 to 99.5 parts by weight of an (meth)acrylic acid ester of non-tertiary alcohol;
      ii. 0.5 to 15 parts by weight of ethylenically unsaturated having pendent amine photobase generator groups;
      iii. 0 to 10 parts by weight of an acid functional ethylenically unsaturated monomer;
      iv. 0 to 10 parts by weight of a non-acid functional, ethylenically unsaturated polar monomer;
      v. 0 to 5 parts vinyl monomer; and
      vi. 0 to 5 parts of a multifunctional (meth)acrylate;
         wherein the total of components i through vi is 100 parts by weight based on 100 parts by weight total monomer.

2. The crosslinkable composition of claim 1, wherein the photobase generator group of the polyamine photobase generator component is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

3. The crosslinkable composition of claim 1, wherein on exposure to UV irradiation, the photobase generator groups of the polyamine photobase generator component b) photolytically cleave to yield amine groups that crosslink with the amine-reactive functional groups of the polyfunctional amine-reactive component a).

4. The crosslinkable composition of claim 1, wherein the polyfunctional amine-reactive component is a (meth)acrylate copolymer component having pendant amine-reactive functional groups comprises:
   i. 45 to 99.5 parts by weight of an (meth)acrylic acid ester of non-tertiary alcohol;
   ii. 0.5 to 15 parts by weight of ethylenically unsaturated monomer having amine-reactive functional groups;
   iii. 0 to 10 parts by weight of an acid functional ethylenically unsaturated monomer;
   iv. 0 to 10 parts by weight of a non-acid functional, ethylenically unsaturated polar monomer;
   v. 0 to 5 parts vinyl monomer; and
   vi. 0 to 5 parts of a multifunctional (meth)acrylate;
      based on 100 parts by weight total monomer.

5. The crosslinkable composition of claim 4 wherein the (meth)acrylate copolymer component having pendant amine-reactive functional groups has zero weight percent of multifunctional (meth)acrylate monomer units.

6. The crosslinkable composition of claim 4 wherein (meth)acrylate copolymer having amine-reactive functional groups is of the formula:

~[M$^{ester}$]$_a$[M$^{acid}$]$_b$[M$^{FG}$]$_f$[M$^{polar}$]$_d$[M$^{multi}$]$_e$~, where

[M$^{ester}$] represents (meth)acrylate monomer units, [M$^{acid}$] represent acid functional monomer units, [M$^{FG}$] are monomer units having an amine-reactive functional group [M$^{polar}$], represents non-acid polar monomer units, [M$^{multi}$] represent multifunctional (meth)acrylate monomer units, and the subscripts a, b, f, d and e represent the parts by weight of the respective monomer units in the copolymer.

7. The crosslinkable composition of claim 4 wherein the amine-reactive functional groups of the (meth)acrylate polymer are selected from carboxyl, oxazolinyl, azlactone, acetyl, acetonyl, acetoacetyl, ester, isocyanato, epoxy, aziridinyl, acyl halide, and cyclic anhydride groups.

8. The crosslinkable composition of claim 4 wherein the (meth)acrylate copolymer component having pendant amine-reactive functional groups comprises monomer units derived from monomers of the formula:

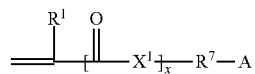

wherein
X$^1$ is —O— or —NR$^1$—, where R$^1$ is H or C$_1$-C$_4$ alkyl,
R$^1$ is H or C$_1$-C$_4$ alkyl;
R$^7$ is a single bond or a (hetero)hydrocarbyl linking group,
A is a functional group that is reactive with the amino groups of the polyamine polymer, and
x is 0 or 1.

9. The crosslinkable composition of claim 8 wherein A is an amine-reactive functional selected from carboxyl, oxazolinyl, azlactone, acetyl, acetonyl, acetoacetyl, ester, isocyanato, epoxy, aziridinyl, acyl halide, and cyclic anhydride groups.

10. The crosslinkable composition of claim 1, where the polyfunctional amine-reactive component is a (meth)acrylate copolymer component having pendant amine-reactive functional groups and wherein the polyamine photobase generator comprises a (meth)acrylate copolymer having pendent amine photobase generator groups.

11. The crosslinkable composition of claim 10 wherein the (meth)acrylate copolymer having pendent amine photobase generator groups has zero weight percent of multifunctional (meth)acrylate monomer units.

12. The crosslinkable composition of claim 10 wherein the amine-reactive functional groups of the (meth)acrylate polymer are selected from carboxyl, oxazolinyl, azlactone, acetyl, acetonyl, acetoacetyl, ester, isocyanato, epoxy, aziridinyl, acyl halide, and cyclic anhydride groups.

13. The crosslinkable composition of claim 10 wherein the (meth)acrylate copolymer having an amine-reactive functional group comprise monomer units of the formula:

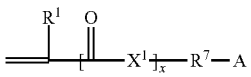

wherein
$X^1$ is —O— or —$NR^1$—, where $R^1$ is H or $C_1$-$C_4$ alkyl,
$R^1$ is H or $C_1$-$C_4$ alkyl;
$R^7$ is a single bond or a (hetero)hydrocarbyl linking group,
A is a functional group that is reactive with the amino groups of the acrylate PBG, and
x is 0 or 1.

14. The crosslinkable composition of claim 13 wherein A is an amine-reactive functional selected from carboxyl, oxazolinyl, azlactone, acetyl, acetonyl, acetoacetyl, ester, isocyanato, epoxy, aziridinyl, acyl halide, and cyclic anhydride groups.

15. The crosslinkable composition of claim 1 wherein the (meth)acrylate copolymer having pendent amine photobase generator groups is of the formula:

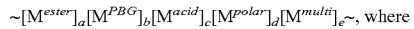

$\sim[M^{ester}]_a[M^{PBG}]_b[M^{acid}]_c[M^{polar}]_d[M^{multi}]_e\sim$, where $[M^{ester}]$ represents (meth)acrylate monomer units, $[M^{PBG}]$ represents photobase monomer units, $[M^{acid}]$ represent acid functional monomer units, $[M^{polar}]$ represent non-acid polar monomer units, $[M^{multi}]$ represent multifunctional (meth)acrylate monomer units, and the subscripts a to e represent the parts by weight of the respective monomer units in the adhesive copolymer.

16. The photolyzed (meth)acrylate copolymer of claim 15 of the formula:

$\sim[M^{ester}]_a[M^{AMINE}]_{b*}[M^{acid}]_c[M^{polar}]_d[M^{multi}]_e\sim$,
where $[M^{ester}]$ represents (meth)acrylate monomer units, $[M^{acid}]$ represent acid functional monomer units, $[M^{AMINE}]$ are monomer units having a pendant amine group $[M^{polar}]$, represents non-acid polar monomer units, $[M^{multi}]$ represent multifunctional (meth)acrylate monomer units, and the subscripts a, b*, c, d and e represent the parts by weight of the respective monomer units in the adhesive copolymer.

17. The crosslinkable composition of claim 10 wherein the (meth)acrylate copolymer having pendent amine photobase generator groups comprises interpolymerized monomer units of general formula:

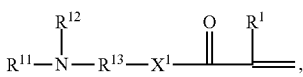

wherein
$R^{11}$ comprises a photolabile group that on exposure to light provides an amine group;
$R^{12}$ is H or a $C_1$-$C_4$ alkyl group;
$R^{13}$ is a (hetero)hydrocarbyl group, including divalent alkylene or arylene;
$X^1$ is —O—, —S— or —$NR^1$—, and
$R^1$ is H or $C_1$-$C_4$ alkyl.

18. The crosslinkable composition of claim 17 wherein $R^{11}$ is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

19. The crosslinkable composition of claim 10 comprising 5 to 10 parts by weight, of photobase monomer units.

20. The crosslinkable composition of claim 10 wherein the (meth)acrylate copolymer having pendent amine photobase generator groups is prepared by free radical polymerization of amine photobase functional monomer units, (meth)acrylate monomer units, optional acid-functional monomer units, optional non-acid functional, polar monomer units, optional vinyl monomer units and optional multifunctional (meth) acrylate monomer units.

21. The crosslinkable composition of claim 10, wherein the photobase generator monomer units are ortho-nitrobenzyl carbamates of the formula:

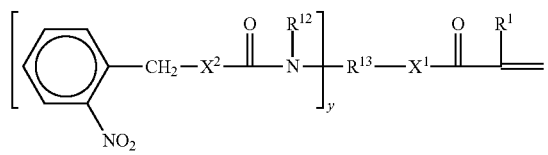

where
$R^{12}$ is hydrogen or alkyl,
$R^1$ is H or $C_1$-$C_4$ alkyl;
$X^1$ and $X^2$ are independently —O—, —$NR^1$— or —S—;
$R^{13}$ is polyvalent alkyl or aryl, and y is at least 1.

22. The crosslinkable composition of claim 1 comprising a polyfunctional amine-reactive component is of the formula:

$R^{16}$—$(Z)_y$, where $R^{16}$ is a (hetero)hydrocarbyl group, Z is an amine-reactive group, and y is ≥2, and (meth)acrylate copolymer having pendent amine photobase generator groups.

23. The crosslinkable compositon of claim 22 wherein Z is selected from carboxyl, oxazolinyl, azlactone, acetyl, acetonyl, acetoacetyl, ester, isocyanato, epoxy, aziridinyl, acyl halide, and cyclic anhydride groups.

24. The crosslinkable composition of claim 22 wherein said the polyfunctional amine-reactive component is of the formula:

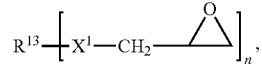

where
$R^{13}$ is an alkylene or arylene having a valence of n;
$X^1$ is —O— or —$NR^1$—, where $R^1$ is H or $C_1$-$C_4$ alkyl, and n is 2 to 6.

25. The crosslinkable composition of claim 22 wherein the (meth)acrylate copolymer having pendent amine photobase generator groups has zero weight percent of multifunctional (meth)acrylate monomer units.

26. The crosslinkable composition of claim 22 comprising 5 to 10 parts by weight, of photobase monomer units.

27. The crosslinkable composition of claim 22 wherein the (meth)acrylate copolymer having pendent amine photobase generator groups is prepared by free radical polymerization of amine photobase functional monomer units, (meth)acrylate monomer units, optional acid-functional monomer units, optional non-acid functional, polar monomer units, optional vinyl monomer units and optional multifunctional (meth) acrylate monomer units.

28. The crosslinkable composition of claim 22 wherein the (meth)acrylate copolymer having pendent amine photobase generator groups comprises interpolymerized monomer units interpolymerized monomer units of general formula:

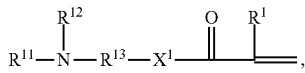

wherein
$R^{11}$ comprises a photolabile group that on exposure to light provides an amine group;
$R^{12}$ is H or a $C_1$-$C_4$ alkyl group;
$R^{13}$ is a (hetero)hydrocarbyl group, including divalent alkylene or arylene;
$X^1$ is —O—, —S— or —$NR^1$—, and
$R^1$ is H or $C_1$-$C_4$ alkyl.

29. The crosslinkable composition of claim 28 wherein $R^{11}$ is an oxime ester, a benzyl carbamate, a benzoin carbamate, an O-carbamoylhydroxyamine, an O-carbamoyloxime, an aromatic sulfonamide, an N-arylformamide, or an 4-(ortho-nitrophenyl)dihydropyridine.

30. The crosslinkable composition of claim 22 wherein the photobase generator group of the (meth)acrylate copolymer having pendent amine photobase generator groups is a benzyl carbamate, a formal, an oxime ester, a benzyl carbamates, a benzoin carbamate, an o-carbamoylhydroxyamine, an O-carbamoyloxime, an aromatic sulfonamide, an alpha-lactam, an N-(2-allylethenyl)amide, an arylazide, an N-arylformamides, or an 4-(ortho-nitrophenyl)dihydropyridine.

31. The copolymer of claim 22, wherein the photobase generator monomer units of the (meth)acrylate copolymer having pendent amine photobase generator groups are ortho-nitrobenzyl carbamates of the formula:

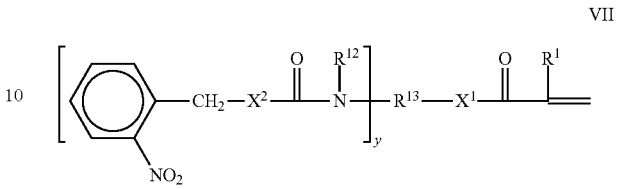

where
$R^{12}$ is hydrogen or alkyl,
$R^1$ is H or $C_1$-$C_4$ alkyl;
$X^1$ and $X^2$ are independently —O—, —$NR^1$— or —S—;
$R^{13}$ is polyvalent alkyl or aryl, and y is at least 1.

32. The crosslinkable composition of claim 22 wherein the (meth)acrylate copolymer having pendent amine photobase generator groups is prepared by free radical polymerization of amine photobase functional monomer units, (meth)acrylate monomer units, optional acid-functional monomer units, optional non-acid functional, polar monomer units, optional vinyl monomer units and optional multifunctional (meth)acrylate monomer units.

33. An adhesive article comprising the crosslinked adhesive composition of claim 1 on a backing.

* * * * *

UNITED STATES PATENT AND TRADEMARK OFFICE
CERTIFICATE OF CORRECTION

| | | |
|---|---|---|
| PATENT NO. | : 9,217,050 B2 | Page 1 of 1 |
| APPLICATION NO. | : 14/379762 | |
| DATED | : December 22, 2015 | |
| INVENTOR(S) | : Fornof et al. | |

It is certified that error appears in the above-identified patent and that said Letters Patent is hereby corrected as shown below:

Title page, Column 2,
Item (56) Under "Other Publications" line 4, delete "Polyazlactones,'" and insert
-- "Polyazlactones," --, therefor.

In the Specification,
Column 7,
Line 31, delete "di(meth)acrylatc," and insert -- di(meth)acrylate, --, therefor.

Column 8,
Line 21, delete "le" and insert -- $R^7$ --, therefor.

Column 10,
Line 8, delete "1,3-bis(3-aminopropyl)tetramethyldisiloxanc," and insert
-- 1,3-bis(3-aminopropyl)tetramethyldisiloxane, --, therefor.

Lines 29 and 30, delete "(R9—(NR6H)," and insert -- (R9—(NR6H)y, --, therefor.

Column 12,
Line 11, delete "$R^{11}$ it" and insert -- $R^{11}$ --, therefor.

Column 17,
Line 35, delete "perbcnzoate." and insert -- perbenzoate. --, therefor.

Column 22,
Line 64, delete "6 9" and insert -- 6-9 --, therefor.

Signed and Sealed this
Fourteenth Day of June, 2016

Michelle K. Lee
*Director of the United States Patent and Trademark Office*